Jan. 3, 1933. O. COUNCIL ET AL 1,893,131
BORDER AND PANEL CONNECTING MACHINE
Filed March 3, 1932 3 Sheets-Sheet 3

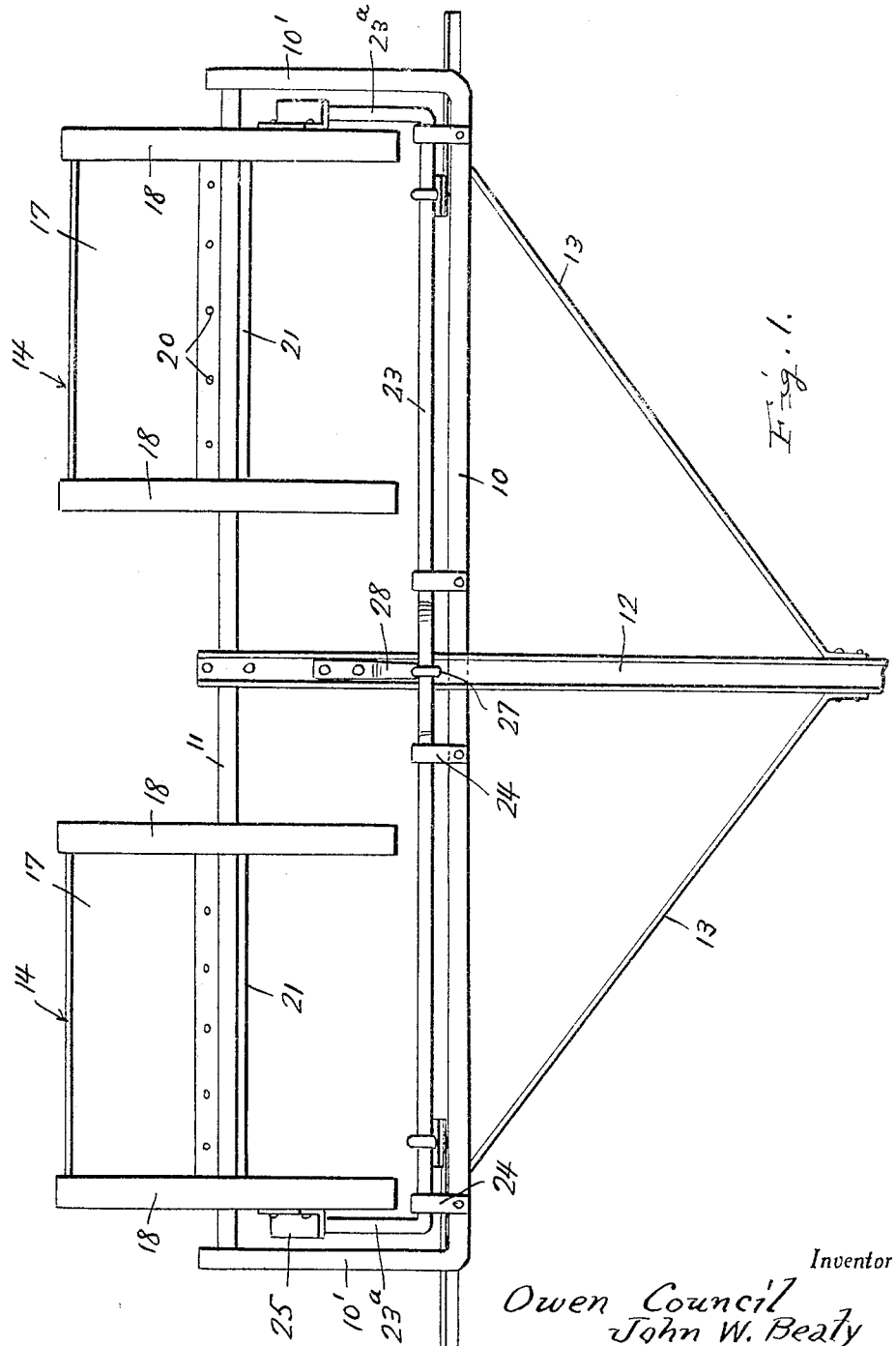

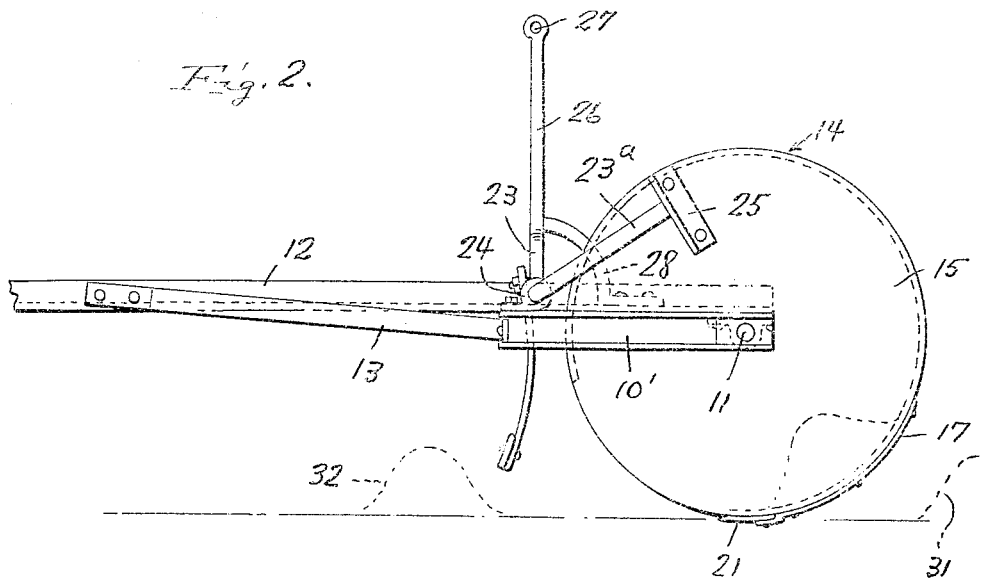
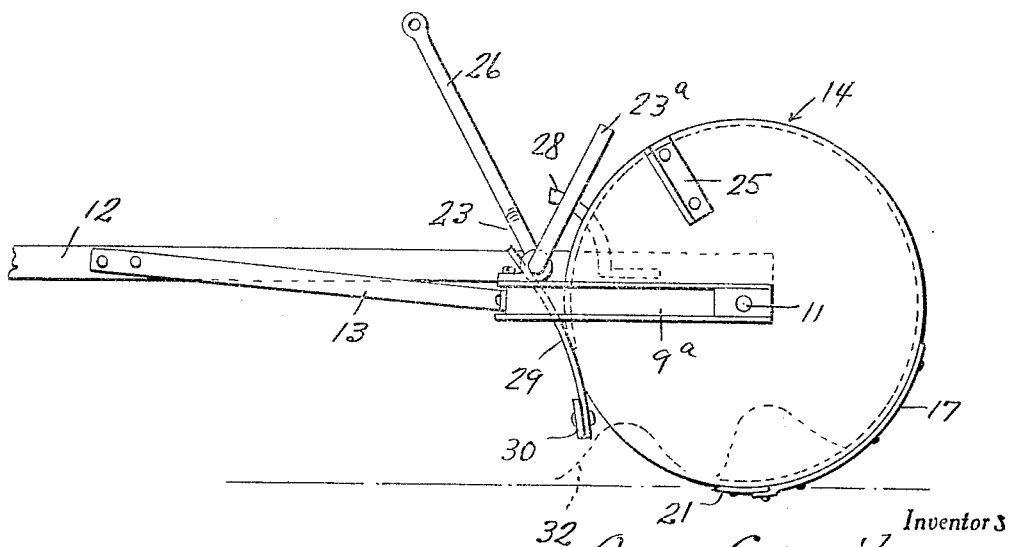

Inventors
Owen Council
John W. Beaty
Roy O. Baker
By Clarence A. O'Brien
Attorney Patented Jan. 3, 1933

1,893,131

UNITED STATES PATENT OFFICE

OWEN COUNCIL, JOHN W. BEATY AND ROY O. BAKER, OF MISSION, TEXAS

BORDER AND PANEL CONNECTING MACHINE

Application filed March 3, 1932. Serial No. 596,648.

This invention is what may be termed a border and panel connecting machine and the invention will be best understood from the following:

In arid and semi-arid regions, where the natural rainfall is not sufficient for agricultural purposes and where irrigation must necessarily be resorted to in the raising of crops, citrus trees, truck gardens and so forth, a practice known locally as "bordering" is resorted to and this bordering consists in providing the area to be used for agricultural purposes, with a net work of earth mounds or ridges for the purpose of retaining, directing, diverting and controlling the flow of water used in irrigation, and the exact shape and form of the "plots" or areas depend upon the contour of the terrain being irrigated.

This so called "bordering" is accomplished through the medium of what is known as "border" making machine for forming the ridges of the earth and provide the aforementioned net work of earth mounds which serve the purpose above mentioned.

The present difficulty encountered with the use of such machines now employed is that one set of such ridges or mounds will be continuous while the ridges at right angles to the first named ridges are interrupted by the first named ridges thus leaving at each corner of each blocked off area of the field a gap or space which, under the present practice, must be filled in by manual labor, and with the use of shovels, hoes or like implements.

It is to overcome the need of this manual labor that forms a salient object of this invention, the present invention being a machine for mechanically performing this last designated operation.

In the drawings:

Figure 1 is a top plan view of the machine.

Figure 2 is a side elevational view thereof with the scrapers shown arranged in earth gathering position.

Figure 3 is a view similar to Figure 2 with the scrapers arranged in "dumping" position.

Figure 4:
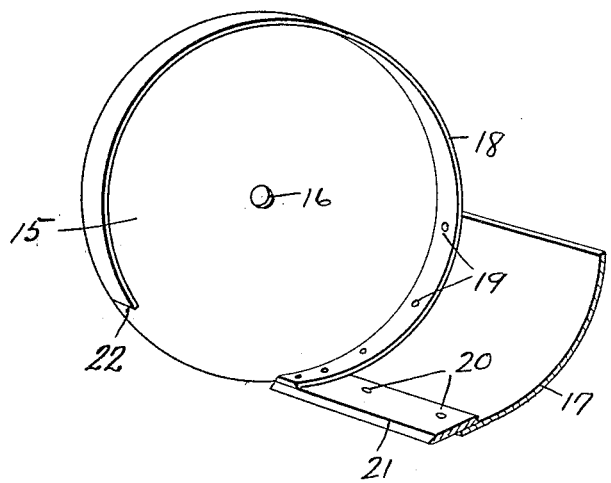
Figure 4 is a perspective view of a portion of one of the scrapers.
Figure 5:
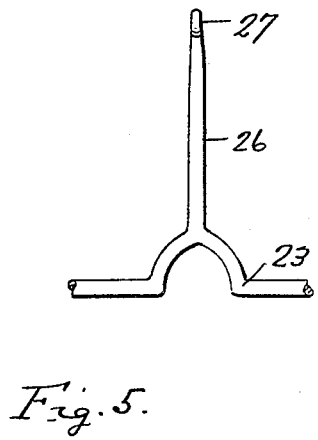
Figure 5 is an elevation view of a trip rod.

Referring in detail to the drawings it will be seen that the machine in accordance with the present invention comprises a substantially U-shaped frame 10 preferably formed of channel iron and supported between the ends 10' of the frame adjacent the open end of the U is an axle shaft 11 journalled in suitable bearings provided adjacent the free end of the frame members 10'.

A forwardly extending draft bar 12 is also provided at its rear end with a suitable bearing accommodating the shaft 11, and the draft bar 12 is braced with respect to the frame 10 through the medium of brace rods 13.

Rotatably supported on the shaft 11 and located adjacent each end thereof is a scraper designated generally by the reference character 14. Since these scrapers 14 are identical in construction, it is thought that a detail description of one will teach the structure of the other. Accordingly the scraper consists of a pair of relatively spaced rimmed discs 15 each provided with a central aperture 16 through which the shaft 11 extends. Connecting the disks 15 is a plate 17 that is curved transversely and is secured at its end to the rims 18 of the disks by rivets or in any other suitable manner indicated generally at 19. On the forward edge of the plate 17 there is riveted or otherwise secured as at 20 a scraping blade 21 which at its end is secured to the rims 18 in substantially the same manner as the ends of the plate 17 is secured to said rims. (See Figure 4).

As also shown in said Figure 4 each rim 18 in advance of the scraper blade 21 is notched as at 22 for a portion thereof whereby to provide for the use of the full length of the blade 21 during the scraping operation.

For retarding rotation of the scrapers 14 in an anti-clockwise direction there is provided a suitable trip mechanism which consists of a rod 23 journalled in bearing brackets 24 provided adjacent the end and also intermediate the ends of the end member of frame 10 as shown in Figure 1. The rod 23 at each end thereof is provided with an angularly disposed terminal or arm 23a arranged to engage stop members or plates 25 fixed on the outer sides of the outer disks 15 of the scrapers 14 adjacent the peripheries of said disks.

Intermediate the ends thereof the trip bar 23 is provided with a vertical shank 26 provided at its upper end with an eye 27 with which one end of a flexible cable or pull cord (not shown) may be connected for rotating the trip bar 23 in an anti-clockwise direction to thereby effect a movement of the arms 23a out of engagement with the stop plate 25.

From the foregoing it will be apparent that the machine is drawn forwardly over the ground, the scrapers 14 will have a tendency to rotate in an anti-clockwise direction, and by reason of arms 23a being in the path of the stop plate 25 also results in a tendency of the trip bar 23 to rotate in a clockwise direction. To prevent the rotation of the scrapers 14 and the trip bar 23 there is mounted on the draft tongue 12 adjacent the rear end thereof a suitable stop member 28 arranged in the path of the shank 26 and with which the shank 26 will engage thereby limiting rotative movement of the trip rod 23 in said clockwise direction.

Thus it will be seen that with the parts as shown in Figure 2 the scrapers 14 will be secured in position as to result in a scraping of dirt by the blades 21 on to the plates 17 of the scraping devices 14.

Means for automatically tripping or rocking the trip bar 23 in an anti-clockwise direction is provided, and such means consists in the provision of longitudinally bowed shanks 29 provided one adjacent each end of the bar 23 and depending therefrom. Each shank 29 is provided with a laterally extending arm or plate 30 arranged so as to engage a ridge of earth during travel of the machine whereby to automatically effect a jumping of the scrapers 14 as will be hereinafter made more apparent.

Figure 6:
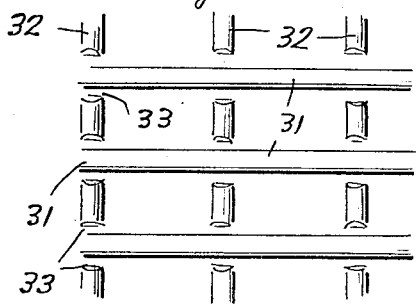
Figure 6 is a diagrammatic view showing the arrangement of the borders or earth ridges preparatory to the aforementioned gap being filled in in accordance with the present invention.

In Figure 6 there is shown somewhat diagrammatically an arrangement of borders, ridges, or earth mounds provided as and for a purpose hereinbefore set forth and the parallel unbroken ridges are designated by the reference characters 31 while the ridges extending at right angles to the ridges 31 are designated generally by the reference characters 32. The last named ridges 32 are interrupted at intervals throughout their respective lengths by the ridges 31 thus leaving gaps 33. Under the present system of forming these borders or ridges 31, 32, these gaps are filled in by manual labor.

In using the border and panel connecting machine embodying the features of the present invention and herein above described in detail, the machine is drawn across the field with the line of travel parallel to the ridges 31 and with the scrapers disposed one to each side of a ridge 31. Thus it will be seen that the machine straddling a ridge 31 in the manner just suggested, and in travelling from one ridge 32 to the next adjacent ridge, will scrape and gather on the plate 17 of the scraping devices a quantity of dirt. When the machine approaches the ridge 32 located in the path of travel of the machine the dirt on the pan or plate 17 of the scrapers is dumped for filling the gap 33 in that particular ridge 32 approached by the machine, which gap so filled will of course be the gap arranged at opposite sides of the ridge 31 straddled by the machine.

This dumping of the dirt for filling the aforementioned gap may be effected either by pulling on the pull cord (not shown) and above referred to thereby rocking the trip rod 23 in an anti-clockwise direction and to the position shown in Figure 3 for moving the arms 23a out of engagement with the stop plate 25 with the result that upon slight forward movement of the machine the scrapers will be rotated for effecting the dumping operation; or the release of the scrapers 14 instead of being manually effected in the manner just mentioned, may be automatically effected by reason of the arms or plates 30 engaging those portions of the ridge 32 lying in the path of the plate 30, this engagement of the arms or plates 30 with said portions of the ridge 32 effecting a rotation of the bar 23 in an anti-clockwise direction in a manner thought apparent and for moving the arms 23 out of engagement with the stop plate 25, or to the position shown in Figure 3.

By causing the machine to travel along each ridge 31 and repeating this operation adjacent each ridge 32, all the gaps 33 may be expeditiously filled and a completion of the bordering operation attained in a minimum amount of time and with a minimum amount of labor.

Even though we have herein shown and described the preferred embodiments of our invention, it is to be understood that in actual practice the changes may be made therein without departing from the spirit of the invention, and accordingly we claim all such forms of the invention to which we are entitled, intending in no wise to limit the invention beyond the requirements of the prior art and scope of the appended claim.

Having thus described our invention what we claim as new is:

A machine of the class described comprising in combination a rotatably mounted scraper, a stop plate on said scraper, a rockably mounted trip mechanism having an arm arranged in the path of said stop plate to retard rotation of the scraper in one direction, a relatively fixed stop member cooperable with said trip and engaged by said trip when the trip arm is engaged with said stop plate, and a member connected to said trip and adapted to be engaged with and actuated by an obstruction in the path of said scraper for rotating said trip to release said scraper.

In testimony whereof we affix our signatures.

OWEN COUNCIL.
JOHN W. BEATY.
ROY O. BAKER.